United States Patent [19]

Belano

[11] Patent Number: 4,870,395

[45] Date of Patent: Sep. 26, 1989

[54] BATTERY POWERED SMOKE ALARM SAFETY LOCKOUT SYSTEM

[75] Inventor: Gary Belano, Lake Zurich, Ill.

[73] Assignee: Seatt Corporation, Downers Grove, Ill.

[21] Appl. No.: 166,177

[22] Filed: Mar. 10, 1988

[51] Int. Cl.[4] ....................... G08B 23/00; F16M 13/00

[52] U.S. Cl. ..................................... 340/693; 248/550

[58] Field of Search ............... 340/693, 628, 636, 687; 248/550; 312/245, 319; D10/106

[56] References Cited

U.S. PATENT DOCUMENTS 4,228,428 10/1980 Niedermeyer .................. 340/693 X

*Primary Examiner*—Glen R. Swann, III

*Assistant Examiner*—Thomas J. Mullen, Jr.

*Attorney, Agent, or Firm*—Niro, Scavone, Haller & Niro, Ltd.

[57] ABSTRACT

Disclosed is a safety lockout system for battery powered smoke alarms. The body of the smoke alarm is removably securable to a mounting bracket that is attached to the wall or ceiling of a building. The safety lockout system prevents securing the body of the smoke alarm to the mounting bracket prior to the installation of a battery. Once a battery is installed in the body of the smoke alarm, it may easily be secured to the mounting bracket attached to the wall or ceiling.

5 Claims, 1 Drawing Sheet

FIG. 1
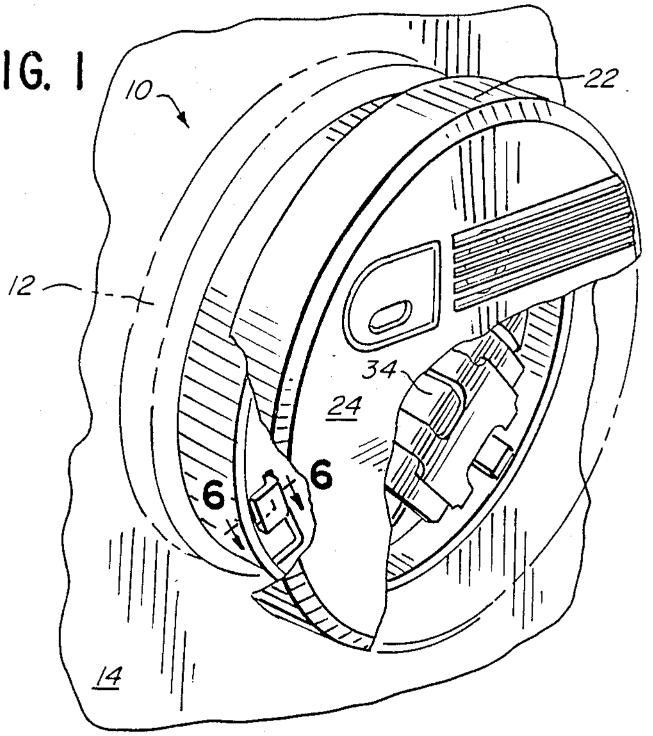
FIG. 2
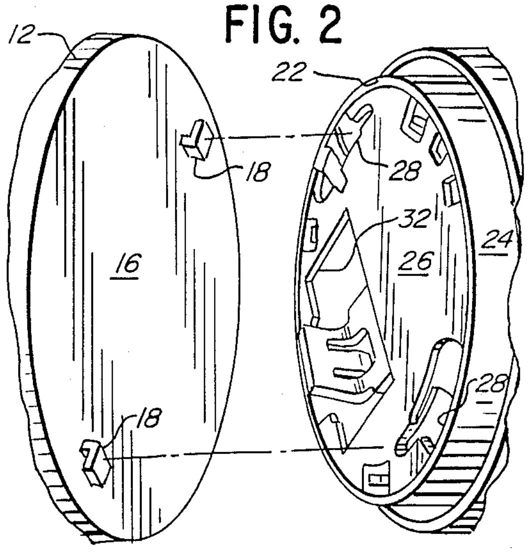
FIG. 3
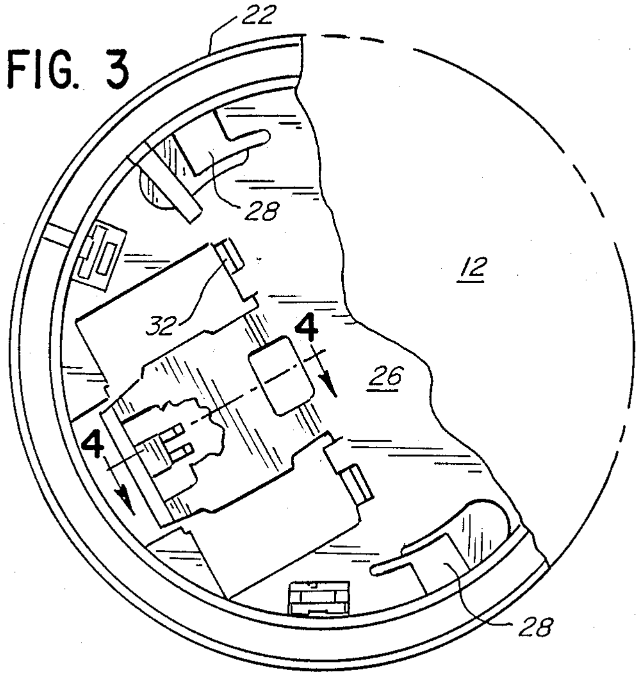
FIG. 4
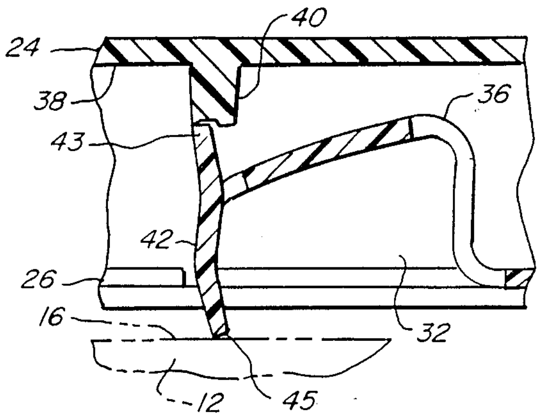
FIG. 5
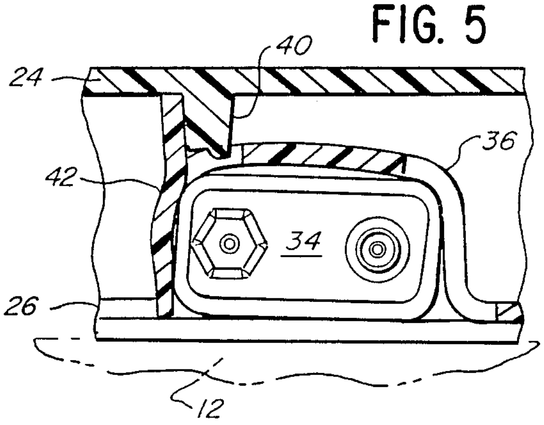
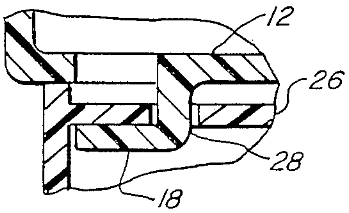
FIG. 6

BATTERY POWERED SMOKE ALARM SAFETY LOCKOUT SYSTEM

BACKGROUND OF THE INVENTION

1. Field of the Invention

The present relates generally to battery powered combustion products smoke alarms, and more particularly, to mechanical means for insuring that a battery is properly installed in such smoke alarms when mounted in an operative location.

2. Description of the Prior Art

Battery powered smoke alarms are extremely effective at reducing deaths from fires. However, when the smoke alarm is mounted to a wall or ceiling in an operative location it is difficult if not impossible to visually ascertain whether a battery is installed in the smoke alarm without physically disassembling it. Consequently, it is possible for a smoke alarm to appear to be operational without a battery. In such instances, the alarm is not functional, it is not protecting the building's occupants, and they cannot readily discover this by visual inspection.

SUMMARY OF THE INVENTION

An object of the present invention is to provide an improved battery powered smoke alarm that cannot be properly assembled in an operative location without first installing a battery.

Briefly, the present invention includes a battery powered smoke alarm having a mounting bracket for securing it to a wall, ceiling or other interior surface of a building. The battery powered smoke alarm also includes a body that houses the operative components of the alarm, including its battery, and is removably secured to the mounting bracket. In the preferred embodiment, the body includes a base in which a pocket is formed for receiving the battery. The mounting bracket and the base of the body include mating structures which secure the body to the mounting bracket while also allowing its easy removal for battery installation. In the preferred embodiment, the battery pocket is adapted to prevent securing the body to the mounting bracket if no battery is installed within the pocket. Consequently, it is impossible to properly assemble the smoke alarm in an operative location without first installing a battery.

These and other features, objects and advantages will be understood or apparent to those of ordinary skill in the art from the following detailed description of the preferred embodiment as illustrated in the various drawing figures.

BRIEF DESCRIPTION OF THE DRAWINGS

FIG. 1 is a perspective view depicting a smoke alarm in accordance with the present invention with portions of its outer cover broken away to illustrate internal parts;

FIG. 2 is an exploded perspective view of the smoke alarm of FIG. 1 when disassembled for installation of a battery;

FIG. 3 is a rear view of the smoke alarm of FIG. 1 with a portion of the mounting bracket broken away to illustrate a pocket for receiving a battery;

FIG. 4 is a cross-sectional view taken along the line 4—4 of FIG. 1 and depicting the battery pocket construction without a battery installed;

FIG. 5 is a cross-sectional view similar to that of FIG. 4 but depicting the battery properly installed; and FIG. 6 is a cross-sectional view of a locking structure for securing the body to the mounting bracket taken along the line 6—6 of FIG. 1.

DETAILED DESCRIPTION OF THE PREFERRED EMBODIMENT

FIGS. 1-3 depict a smoke alarm in accordance with the present invention referred to generally as 10. Smoke alarm 10 includes a mounting bracket 12 that is secured in any conventional manner to an interior surface 14 of a building. As illustrated in FIG. 2, mounting bracket 12 has a planar surface out of which project two, diametrically opposed, L-shaped arms 18.

Smoke alarm 10 also includes a body 22. Body 22 includes an outer cover 24 which receives and encloses a base plate 26. Any conventional smoke alarm electronic circuit, not illustrated, that is powered by a battery is housed within body 22. Formed through base plate 26 are a pair of diametrically opposed slots 28 adapted to mate with and engage L-shaped arms 18. Thus, body 22 is secured to mounting bracket 12 by mating slots 28 in base plate 26 with arms 18 and then slightly rotating body 22. FIG. 6 illustrates the relationship between L-shaped arms 18 and slots 28 when base plate 26 secures body 22 to mounting bracket 12. Body 22 may be easily removed from mounting bracket 12 by slightly rotating body 22 in the opposite direction and then lifting from mounting bracket 12 so that arms 18 no longer engage slots 28.

As illustrated in FIGS. 1 through 3, base plate 26 includes a hollow pocket 32 adapted to receive a battery 34. As best illustrated in FIG. 4, pocket 32 includes a battery bracket or clamp 36 for securing battery 34 within pocket 32. Outer cover 24 has an inner surface 38 which faces base plate 26. A projecting boss 40 extends inward from surface 38 at a location adjacent to battery clamp 36. Battery clamp 36 includes a finger 42 one end 43 of which abuts against boss 40 when no battery is installed in pocket 32. The engagement of finger end 43 with boss 40 causes the opposite end 45 of finger 40 to project outward from base plate 26. Thus, if installation of body 22 onto mounting bracket 12 is attempted without battery 24 installed in pocket 32, the end 45 of finger 42 strikes surface 16 of mounting bracket 12 preventing proper installation of body 22 onto mounting bracket 12. However, as illustrated in FIG. 5, when battery 34 is properly installed in pocket 32 and clamped therein by battery clamp 36, finger 42 is displaced laterally and its end 43 no longer engages boss 40 nor does its other end 45 project out of base plate 26. Accordingly, body 22 may be easily secured to mounting bracket 12 after battery 34 is installed in pocket 32.

In accordance with the teachings of this patent, body 22 of smoke alarm 10 cannot be properly secured to mounting bracket 12 unless battery 34 is installed in pocket 32. Thus, it is impossible to assemble smoke alarm 10 without first properly installing battery 34. Therefore, an occupant of a building in which smoke alarm 10 is installed knows that smoke alarm 10 includes battery 34 upon seeing body 22 secured to mounting bracket 12.

Although the present invention has been described in terms of the presently preferred embodiment, is to be understood that such disclosure is purely illustrative and is not be interpreted as limiting. For example, outer cover 24 might be removable for installing battery 34 rather than removing body 22 from mounting bracket 12. For such an arrangement, battery clamp 36 would be configured to prevent installation of cover 24 when smoke alarm 10 lacks battery 34. Consequently, without departing from the spirit and scope of the invention, various alterations, modifications, and/or alterative applications of the invention, will, no doubt, be suggested to those skilled in art after having read the proceeding disclosure. Accordingly, it is intended that the following claims be interpreted as encompassing all alterations, modifications, or alterative applications as fall within the true spirit and scope of the invention.

What is claimed is:

1. In a battery powered combustion products detector having a mounting bracket for securing said detector to an interior surface of a building land a body that is removable from said mounting bracket to allow installation of a battery in said detector, the improvement which comprises:

mating and engageable locking means for removably securing said body to said mounting bracket upon engagement of said locking means; and battery safety lockout means for obstructing the engagement of said locking means and the securing of said body to said mounting bracket if no battery is installed in said detector.

2. The improved combustion products detector of claim 1 wherein said body includes a base a pocket formed therein for receiving the battery and a battery clamp located in said pocket for securing the battery therein, said battery clamp having a finger which strikes said mounting bracket to obstruct engagement of said locking means when said battery clamp is not securing the battery; said finger also being movable to a position in which said finger does not strike said mounting bracket thereby allowing engagement of said locking means.

3. The improved combustion products detector of claim 2 wherein said body has an inner surface from which a boss projects proximate said battery clamp; and said battery clamp includes a tab which engages said boss when no battery is secured by said battery clamp, whereby said finger of said battery clamp is held in an output extending position for striking said mounting bracket to obstruct engagement of said locking means.

4. The improved combustion products detector of claim 2 wherein said body is adapted for receiving a smoke alarm electronic circuit for which the battery supplies electrical power.

5. A smoke alarm assembly, comprising:

a mounting bracket adapted to mount said mount alarm to a supporting surface;

body having a size and configuration suitable for housing electronic circuitry for detection of combustion products and for issuing an alarm in response thereto; said body also including means for receiving and retaining a battery to power said circuitry;

means for releasably securing said body to said mounting bracket; and an extendable and retractable finger; said finger being positioned in a extended position projecting from said body to prevent proper operation of said securing means when said battery is not mounted within said receiving means, and said finger being positioned in a retracted position within said body to permit proper operation of said securing means when said battery is mounted within said receiving means.

* * * * *

UNITED STATES PATENT AND TRADEMARK OFFICE

CERTIFICATE OF CORRECTION

PATENT NO. : 4,870,395
DATED : September 26, 1989
INVENTOR(S) : Gary Belano

It is certified that error appears in the above-identified patent and that said Letters Patent is hereby corrected as shown below:

Claim 1, line 3, "land" should read --and--.

Claim 2, line 2, insert --having--before "a pocket".

Claim 3, line 7, "output" should read --outwardly--.

Signed and Sealed this

Twenty-fifth Day of September, 1990

*Attest:*

HARRY F. MANBECK, JR.

*Attesting Officer* *Commissioner of Patents and Trademarks*